July 11, 1961 R. MORRISSON 2,992,177
IONIZATION COOLING
Filed Feb. 4, 1958

INVENTOR
REEVES MORRISSON
BY M. B. Tasker
ATTORNEY

United States Patent Office 2,992,177
Patented July 11, 1961

2,992,177
IONIZATION COOLING
Reeves Morrisson, West Hartford, Conn., assignor to United Aircraft Corporation, East Hartford, Conn., a corporation of Delaware
Filed Feb. 4, 1958, Ser. No. 713,269
19 Claims. (Cl. 204—193.2)

This invention relates to improved means and a method for enabling a cooling gas stream to absorb a greater amount of heat and for making this increased energy available for useful work.

It is known that a gas when heated to a high temperature will tend to ionize. The amount of energy absorbed by the atoms of the gas in the process of ionization is very much larger than that represented by the increase in temperature from the initial heating. The temperature to which the gas must be raised to produce a high level of ionization is, however, higher than that which can be handled by presently known container material.

It is an object of the present invention to provide means and a method for producing a high degree of ionization of a cooling gas stream at a tolerable temperature level.

A further object of the invention is to provide a cooling gas stream of higher heat absorption capabilities for use in a nuclear powered gas turbine engine.

A still further object of the invention is to reduce the amount of coolant required to absorb the required heat from the nuclear reactor and thus reduce the size of the reactor and the weight of shielding required.

It is a still further object of the invention to greatly increase the effective specific heat of a cooling gas stream by continuously withdrawing free electrons from the stream to further increase the capacity of the gas to absorb heat without a corresponding increase in its temperature.

A further object of the invention is to return the energy of ionization of the gas stream by recombination of the ions and electrons which releases the heat absorbed from the reactor in the process of ionization and heats the total cooling airstream prior to its discharge into the turbine, thus making all of the energy available for useful work.

It is a further object of the invention generally to improve the transfer of heat by a cooling gas stream.

These and other objects and advantages of the invention will be evident or will be pointed out in connection with the following detailed description of a preferred embodiment of the invention shown in the accompanying drawing.

Figure 1:
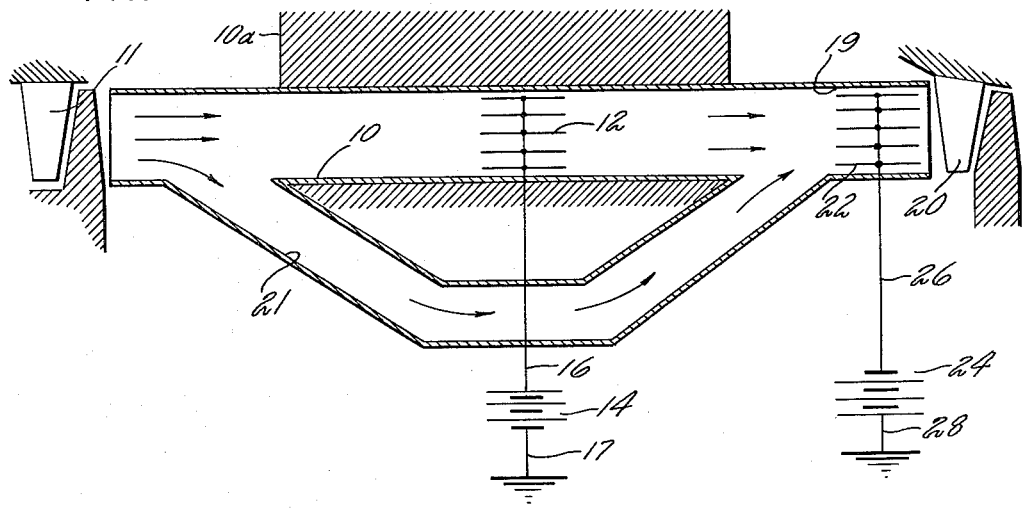
Figure 2:
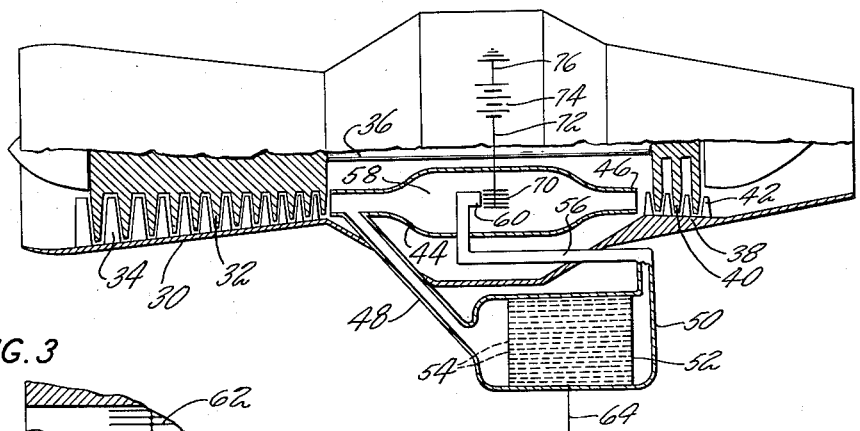
Figure 3:
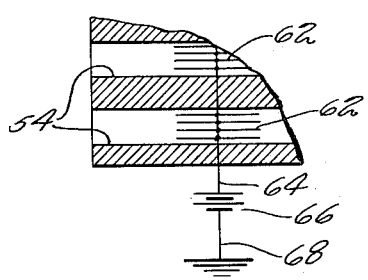

In this drawing:
FIG. 1 illustrates the invention diagrammatically, as applied to an ionization controlled heat transfer system for a nuclear reactor powered gas turbine engine;
FIG. 2 shows somewhat diagrammatically a nuclear powered gas turbine engine embodying the invention; and
FIG. 3 is a detail of the reactor core of FIG. 2.

In FIG. 1, 10 indicates diagrammatically a cooling passage through the core 10a of a nuclear reactor into which a cooling airstream is directed from the rotating blades 11 of the compressor of a gas turbine engine. As the air flows through passage 10, it is heated by the reactor, which causes the air to become partially ionized. An electrode 12 is provided in passage 10 in the form of a plurality of plates through which the airstream passes. These plates progressively draw off the free electrons from the partially ionized air, thus permitting ionization of the airstream to proceed further and increasing the capacity of the cooling air to absorb heat from the reactor. In order to attract the free electrons, which have a negative charge, biasing means in the form of a battery 14 is provided, having its positive terminal connected by conductor 16 to the plates of electrode 12. The negative terminal of battery 14 is connected by conductor 17 to ground in the usual manner.

The temperature to which the air must be raised to produce a high level of ionization would exceed that allowable by the material forming the walls of passage 10. However, by bleeding off the electrons from the ionized air, a high degree of ionization can be produced in the air at a tolerable temperature level.

If it is desired, the reactor cooling airstream may be directed into passage 19 downstream of passage 10 and into the turbine blades 20 of a gas turbine engine, to utilize the high energy of the air in this stream. Additional cooling air is admitted through a passage 21 to reduce the temperature of the highly ionized airstream after it has left the reactor. Preferably, the air admitted through passage 21 is air from compressor blades 11 which has bypassed the reactor. An electrode 22 may be located in the downstream end of passage 19, similar to electrode 12, for the purpose of adding electrons to the ionized airstream. A battery 24 is provided, having its negative terminal connected by conductor 26 to the plates of electrode 22, and having its positive terminal connected by conductor 28 to ground. In this way, electrons are returned to the ionized airstream. Recombination of these returned electrons with the positive ions of the highly ionized airstream releases the heat in the airstream which was absorbed from the reactor by the airstream in the process of ionization and heats the combined airstream.

FIG. 2 shows a gas turbine engine including a compressor 30 having rotating blades 32 and stator blades 34. The compressor is direct connected by a shaft 36 to a turbine 38 having rotating blades 40 and stator blades 42. Part of the air discharged from compressor 30 flows through ducts 44, which are arranged in a circle about shaft 36. One of these ducts is shown in section in FIG. 2. Ducts 44 discharge through nozzles 46 into the turbine 38. The remainder of the air from compressor 30 flows through oblique ducts 48, which branch off from ducts 44 just downstream of the compressor 30. These ducts 48 lead into an annular reactor housing 50, which encloses the annular core 52 of a nuclear reactor. Core 52 has a plurality of longitudinal cooling passages 54 therethrough, as shown most clearly in FIG. 3, through which flows the air discharged into the ducts 48. The downstream end of housing 50 is connected by a plurality of ducts 56 with the several ducts 44. The latter ducts have a central and enlarged chamber 58 into which the ducts 56 discharge in a downstream direction through their discharge ends 60.

As shown most clearly in FIG. 3, electrodes 62 are located in the core passages 54 over which passes the heated gas flowing in ducts 48. These electrodes are connected by a conductor 64 with the positive terminal of a battery 66, the negative terminal of which is grounded by a conductor 68. Another electrode 70 is located downstream of the discharge end 60 of each duct 56 and this electrode is connected through a conductor 72 with the negative terminal of a battery 74, the positive terminal of which is grounded by a conductor 76.

As air from the compressor 30 passes through the several ducts 48 and through passages 54 in the hot reactor core, the air becomes heated and ionized. Under this condition, the free electrons present in the ionized air are withdrawn by the positively biased grid 62. As the hot air proceeds through the duct 56 and is cooled by being mixed with the cool air in duct 44, the free electrons are returned to the ionized airstream by the negatively biased grid 70. Recombination of these returned electrons with the positive ions of the highly ionized airstream releases heat which was absorbed from the reactor core by the airstream in the process of ionization with the result that the airstream which enters the turbine is highly energized.

It will be evident from the above that improved means have been provided for removing heat from the reactor by the airstream flowing through it. It will also be evident that by progressively ionizing the airstream by drawing off free electrons, it is possible to achieve a higher degree of ionization of the airstream than it would otherwise be possible to utilize in existing structures. It will further be evident that by this ionization-cooling system, it has been possible to provide a coolant of higher heat absorption capabilities than hitherto possible. As a result, the use of such a coolant reduces the amount of coolant required to absorb heat from the reactor, which in turn reduces the size of the reactor and saves shielding weight. Further, the reactor is less subject to hot spots, since any localized tendency to high temperature will increase the ionization in that locality and result in greater localized heat absorption.

While one specific embodiment has been shown which the invention may assume in practice, it will be understood that various changes in the construction and arrangement of the parts may be resorted to without departing from the scope of the invention. Thus, while the invention has been disclosed in connection with a nuclear powered gas turbine engine, in which it has great advantages, it will be understood that the invention can be used in numerous other fields wherever it is desired to transfer heat by means of a cooling gas stream, and whether or not the stream of gas is subsequently energized by recombination of the electrons with the positive ions in the ionized stream.

I claim:

1. In combination, a body to be cooled having a heated surface, power operated means for creating a rapidly moving stream of cooling fluid, means for directing said stream over said heated surface for initially heating and partially ionizing the fluid in said stream, means for bleeding off free electrons from the ionized fluid stream comprising a plurality of spaced parallel plates of substantial area having their major surfaces generally parallel with the direction of flow of said stream, and electrical means for positively biasing said plates.

2. In combination, a body having a heated surface to be cooled, power operated means for moving a stream of cooling fluid over said heated surface for initially heating and partially ionizing the fluid in said stream, means for increasing the heat absorbing capabilities of said fluid without a corresponding increase in its temperature including electrode means in extending across said fluid stream for bleeding off free electrons from said heated stream, said electrode means comprising a plurality of spaced parallel plates of substantial area having their major surfaces generally parallel with the direction of flow of said stream and dividing the latter into a plurality of thin layers, and electrical means for positively biasing said plates.

3. In combination, a body to be cooled having a cooling passageway, means for creating a stream of cooling gas under pressure, means for directing said stream of cooling gas through said passageway to initially heat and partially ionize said gas stream, and means for increasing the heat absorbing capabilities of the gas in said stream without a corresponding increase in its temperature comprising a plurality of spaced positively biased electrode means in said gas stream for progressively bleeding off free electrons from said heated gas, said electrode means comprising a plurality of flat plates arranged with their major surfaces parallel with the direction of flow of said stream and subdividing the latter into a number of thin layers.

4. In combination, a nuclear reactor having a core, means for passing a cooling gas stream through said core to initially heat and partially ionize said gas, and means for ionizing said gas to progressively higher levels without a proportional increase in the temperature of the gas comprising biased electrode means in said stream of ionized gas for progressively bleeding off electrons from said ionized gas.

5. In combination, a nuclear reactor having a core, means for passing a cooling gas stream through said reactor to cool said core and initially heat and ionize said gas, and means for progressively increasing the effective specific heat of said gas comprising electrode means in said gas stream for continuously bleeding off electrons from said ionized gas, and electrical means providing a positive bias for said electrode means.

6. In a nuclear powered gas turbine engine, a nuclear reactor, a compressor, a turbine, a chamber between said compressor and said turbine, means for circulating part of the air from said compressor through the core of said reactor and discharging it into said chamber, means for passing the remainder of the air discharged from said compressor directly into said chamber, means for withdrawing free electrons from the airstream which has been heated and partially ionized in said reactor core including a positively biased electrode in the heated airstream, and means to recombine the ions and electrons and release in the combined airstream the heat absorbed from the reactor in the process of ionization comprising a biased electrode in said chamber in the combined airstream for returning free electrons thereto.

7. The method of cooling by a moving stream of gas which consists in compressing a gas, directing the cooling stream of compressed gas over a surface of the device to be cooled whereby the gas is heated and partially ionized, and locating a positively charged electrode in the stream of partially ionized gas to bleed off the free electrons in said stream and increase the heat absorbing property of said gas.

8. The method of abstracting large amounts of heat by means of a cooling gas stream without correspondingly increasing the temperature of the stream which consists in, compressing the cooling gas, passing the pressurized gas stream over a surface to be cooled to heat the gas and partially ionize it, and producing a high level of ionization of the gas by progressively bleeding off free electrons from the ionized gas.

9. The method of abstracting large amounts of heat by means of a cooling gas stream without correspondingly increasing the temperature of the stream which consists in compressing the cooling gas, passing the pressurized gas stream over a surface to be cooled to heat the gas and partially ionize it, and increasing the heat absorbing capabilities of the gas by progressively bleeding off free electrons from the gas as the level of ionization rises.

10. The method of abstracting heat from a cooling passage which comprises the steps of, compressing a cooling gas, directing a stream of said cooling gas through the passage to be cooled to ionize the gas stream, and progressively withdrawing free electrons from the ionized gas stream whereby ionization of the gas stream may continue without raising the temperature of the gas stream to an intolerable level.

11. The methol of abstracting large amounts of heat by means of a cooling gas stream without correspondingly increasing the temperature of the stream which consists in, compressing a gas, passing the stream of gas under pressure through a passageway to be cooled to heat the gas and partially ionize it, and increasing the effective specific heat of the cooling gas by continuously withdrawing free electrons from the gas stream to progressively increase the capacity of the gas to absorb heat while maintaining the gas stream at a tolerable temperature level.

12. The method of transferring heat from a heated body by means of a cooling gas which consists in, compressing a gas, passing a stream of the pressurized gas over the heated body to initially heat and partially ionize the gas, and increasing the heat absorbing capabilities of the gas without proportionately raising its temperature by progressively bleeding off free electrons from the stream of ionized gas as ionization proceeds until the gas is at a relatively high level of ionization.

13. The method of abstracting large amounts of heat from a reactor core by means of a cooling gas stream which consists in, passing a stream of air through a core passage to heat the air and partially ionize it, and progressively bleeding off free electrons from the partially ionized airstream to progressively further ionize the airstream and store more heat in the airstream due to the latent heat of ionization without a corresponding rise in temperature of the airstream.

14. The method of abstracting large amounts of heat by means of a cooling gas stream without a proportional increase in the temperature of the stream which consists in, compressing the gas, passing the pressurized gas stream through a passageway to be cooled to initially heat the gas and partially ionize it, placing a positively biased electrode in the gas stream to bleed off the free negative electrons in the ionized stream and thereby increase the heat absorbing capabilities of the gas as the level of ionization increases.

15. The method of transferring heat from a heated body by means of a cooling gas which consists in, compressing the cooling gas, passing a stream of the pressurized gas over the heated body to initially raise the temperature of the gas to the level at which partial ionization of the gas takes place, and progressively bleeding off free electrons from the ionized gas to transfer the heat generated in the process of ionization into the gas stream without proportionally raising the temperature of the stream.

16. The method of energizing the air discharged from the compressor of a gas turbine engine prior to its admission to the turbine which consists in the steps of diverting a stream of air from the air discharged by the compressor, heating said airstream to partially ionize the air, increasing the heat absorbing capabilities of the air without correspondingly increasing its temperature by bleeding off free electrons from the ionized air to raise the ionization level of the air, mixing cooling air from the compressor with the highly ionized airstream, and energizing the combined airstream by returning electrons to the stream to release in the stream the heat absorbed in the ionization process.

17. The method of energizing the airstream between the compressor and the turbine of a gas turbine engine which consists in the steps of heating a stream of air discharged from the compressor to partially ionize the air, increasing the heat absorbing capabilities of the air without correspondingly increasing its temperature by placing a positively biased electrode in the ionized airstream for progressively bleeding off negative free electrons to further raise the ionization level of the air, admitting cooling air from the compressor into the highly ionized airstream, and placing a negatively biased electrode in the combined airstream for returning electrons to the air to release in the air the heat absorbed by the atoms of the air during the ionization process.

18. The method of cooling by a moving stream of gas which consists in directing the cooling stream through a passage in the device to be cooled wherein the gas is heated and partially ionized, locating a positively charged electrode in the stream of partially ionized gas to bleed off the free negative electrons in said stream and increase the heat absorbing property of said gas, directing a stream of cooling air into said ionized airstream to partially cool the latter, and locating a negatively charged electrode in the stream of partially cooled ionized air to return negative electrons to the positively charged ions of said stream.

19. The method of transferring large amounts of heat from a reactor to the airstream discharged from the compressor of a gas turbine engine without exceeding the tolerable temperature which consists in passing part of the airstream through the reactor to heat and partially ionize the air, and storing the latent heat of ionization of the air flowing through the reactor by bleeding off free electrons from the partially ionized air to progressively further ionize the air to a higher level of ionization without a corresponding increase in the temperature of the air, merging the air which has passed through the reactor with the rest of the airstream from the compressor to cool the highly ionized air from the reactor, and returning the energy of ionization of the airstream by recombination of the ions and electrons to release the heat absorbed from the reactor as the result of the latent heat of ionization and heat the total airstream, and discharging the energized airstream into the engine turbine.

References Cited in the file of this patent
UNITED STATES PATENTS

| | | |
|---|---|---|
| 2,287,463 | Blue | June 23, 1942 |
| 2,487,319 | Ellis | Nov. 8, 1949 |
| 2,865,167 | Worobel | Dec. 23, 1958 |

OTHER REFERENCES

"Proceeding of the Symposium on High Temperature a Tool for the Future," Berkely, Calif., June 25–27, 1956. Publ. by Stanford Research Inst., Menlo Park, Calif., pp. 69–70.

Atomic Energy Commission Document LRL–86, Dissociation Cooling. A Discussion, pp. 5, 6 and 17. Available Scientific Library (received in Library Oct. 8, 1954).